US 7,958,522 B2

(12) United States Patent
Miyata

(10) Patent No.: US 7,958,522 B2
(45) Date of Patent: Jun. 7, 2011

(54) SLOT-IN TYPE DISK APPARATUS

(75) Inventor: Koji Miyata, Ehime (JP)

(73) Assignee: Panasonic Corporation, Osaka (JP)

( * ) Notice: Subject to any disclaimer, the term of this patent is extended or adjusted under 35 U.S.C. 154(b) by 304 days.

(21) Appl. No.: 12/159,195

(22) PCT Filed: Nov. 13, 2006

(86) PCT No.: PCT/JP2006/322567
§ 371 (c)(1),
(2), (4) Date: Feb. 6, 2009

(87) PCT Pub. No.: WO2007/077678
PCT Pub. Date: Jul. 12, 2007

(65) Prior Publication Data
US 2010/0223636 A1 Sep. 2, 2010

(30) Foreign Application Priority Data

Dec. 28, 2005 (JP) .................................. 2005-378944

(51) Int. Cl.
*G11B 17/04* (2006.01)
(52) U.S. Cl. ...................................................... 720/673
(58) Field of Classification Search .................. 720/671, 720/623, 601, 602, 603, 604, 605, 606, 711, 720/646, 624, 621, 619, 713, 615, 626, 620, 720/704, 673, 681, 649, 690, 714, 675, 692, 720/666, 661, 638
See application file for complete search history.

(56) References Cited

U.S. PATENT DOCUMENTS 5,278,819 A  1/1994  Shimegi
(Continued)

FOREIGN PATENT DOCUMENTS

JP  63-36958  3/1988
(Continued)

OTHER PUBLICATIONS

Japanese Office Action dated Mar. 24, 2009 with English translation.
(Continued)

*Primary Examiner* — Allen T Cao
(74) *Attorney, Agent, or Firm* — Dickinson Wright PLLC

(57) ABSTRACT

It is an object of the present invention to provide a slot-in type disk apparatus which can be reduced in thickness without deteriorating strength of a lever and a rear base. In a slot-in type disk apparatus, a base body 10 and a lid 20 constitute a chassis sheath, a disk-insertion opening 11 into which a disk is directly inserted is formed in a front surface of the chassis sheath, a traverse base 30 is disposed on the side of a front surface of the base body 10, a rear base 13 is disposed on the side of a rear surface of the base body 10, a printed board 14 is provided between the rear base 13 and the base body 10, and a link arm 105 is disposed between the rear base 13 and the printed board 14. The rear base 13 is provided at its portion with an opening 13A, a link arm 105 is formed at its portion with a folded piece 105D, which is folded toward the opening 13A, a space is formed on the side of the printed board 14 by the folded piece 105D, and a part 14A to be mounted on the printed board 14 is disposed in correspondence with the space.

4 Claims, 4 Drawing Sheets

U.S. PATENT DOCUMENTS

| | | |
|---|---|---|
| 6,512,728 B1 | 1/2003 | Nasu |
| 2004/0032818 A1 | 2/2004 | Toyama |
| 2010/0299684 A1* | 11/2010 | Huang et al. .................. 720/620 |
| 2010/0313211 A1* | 12/2010 | Katsuki ........................ 720/620 |

FOREIGN PATENT DOCUMENTS

| JP | 4-243049 | 8/1992 |
|---|---|---|
| JP | 04-243049 | 8/1992 |
| JP | 06-068634 | 3/1994 |
| JP | 10-003722 | 1/1998 |
| JP | 10-11880 | 1/1998 |
| JP | 2000-276873 | 10/2000 |
| JP | 2001-202724 | 7/2001 |
| JP | 2002-352498 | 12/2002 |
| JP | 2003-203438 | 7/2003 |
| JP | 2004-19862 | 1/2004 |

OTHER PUBLICATIONS

International Search Report dated Feb. 20, 2007.

* cited by examiner

[FIG1]
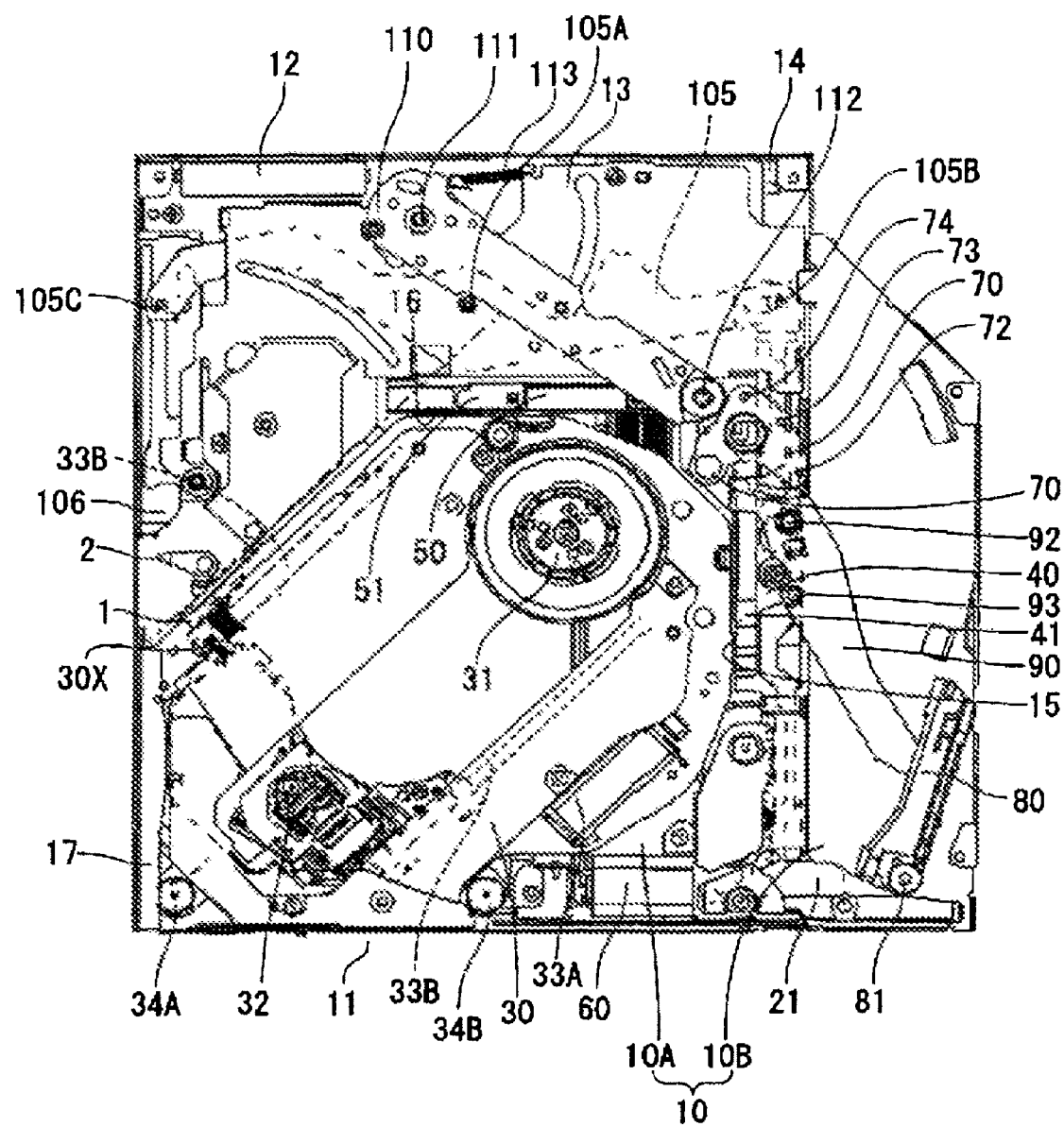

[FIG2]
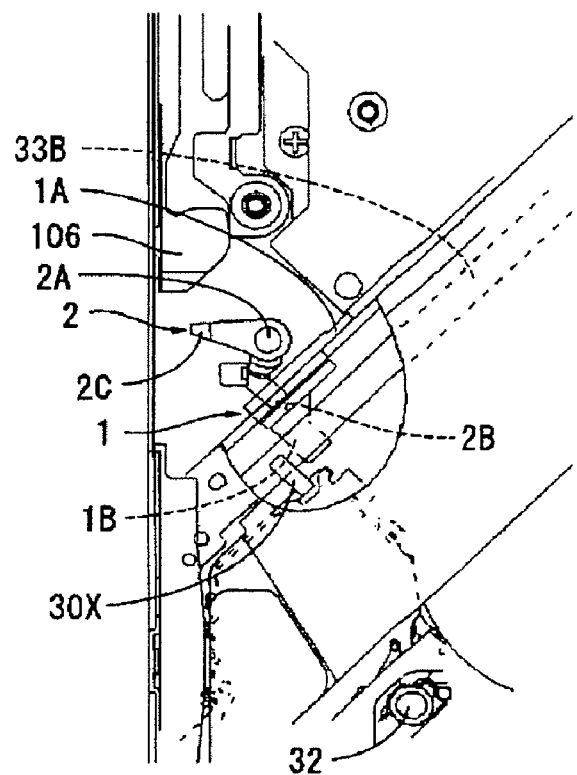
[FIG3]
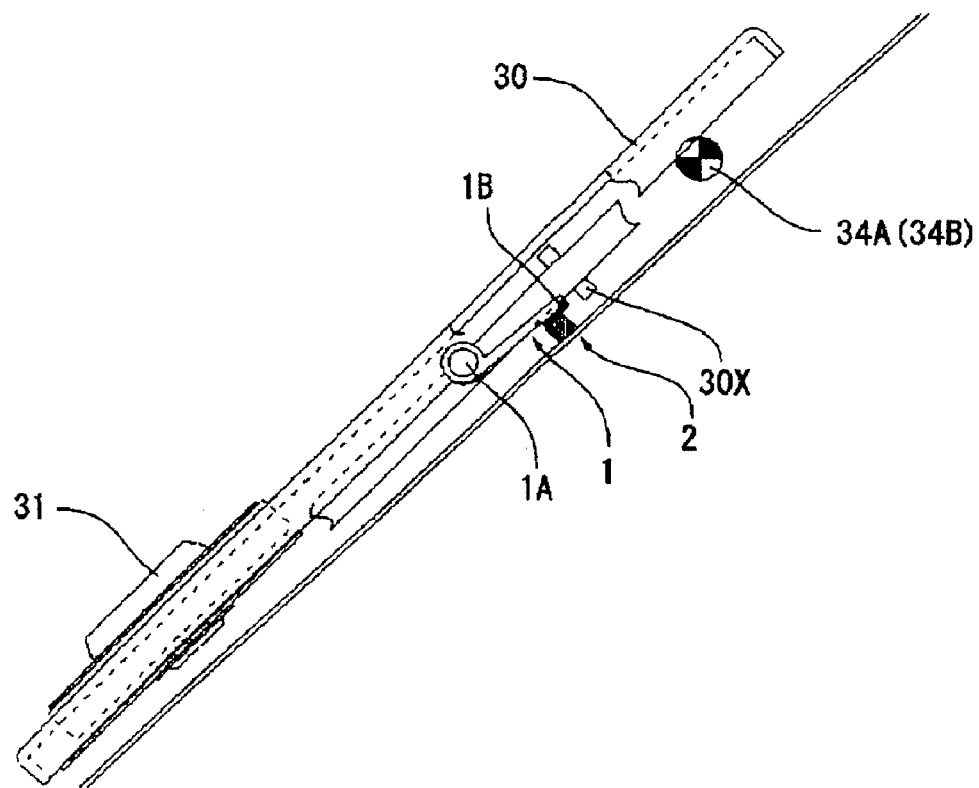

[FIG4]
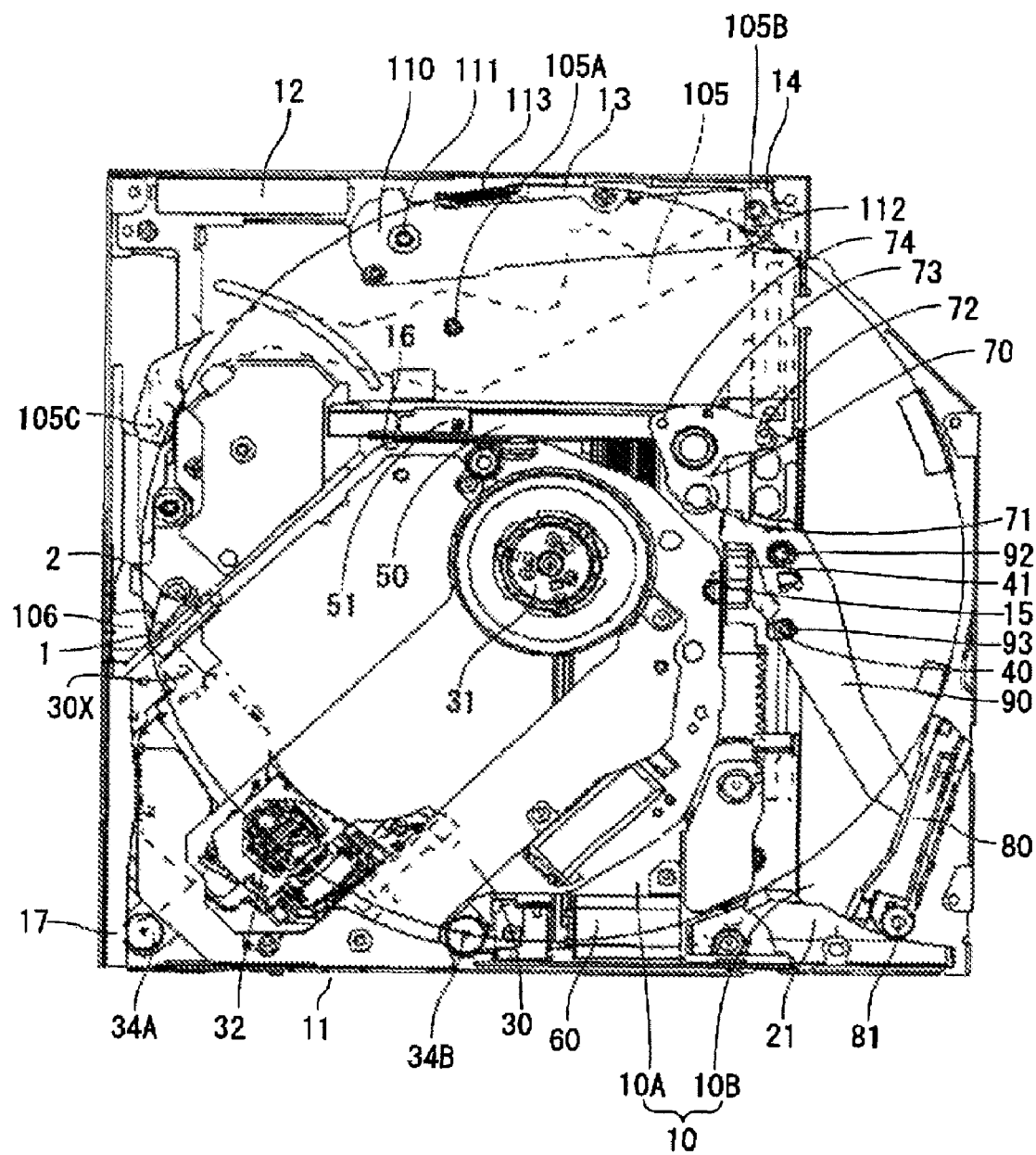

[FIG5]
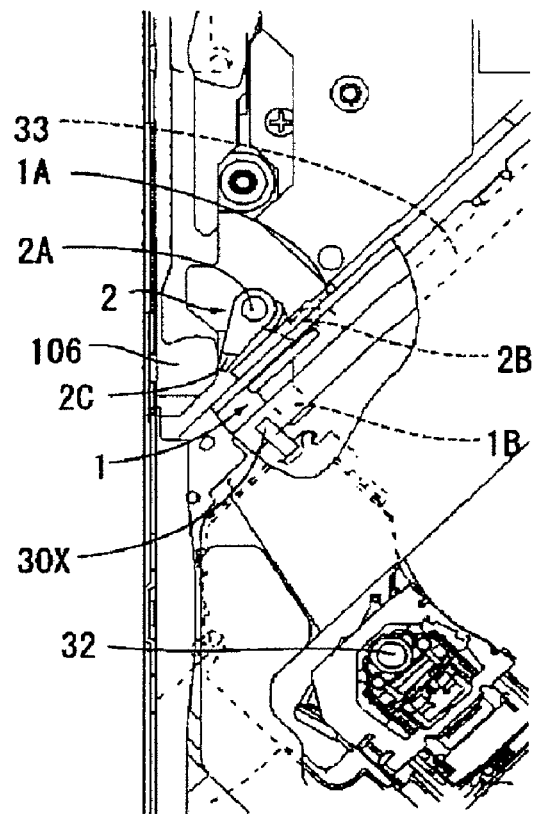
[FIG6]
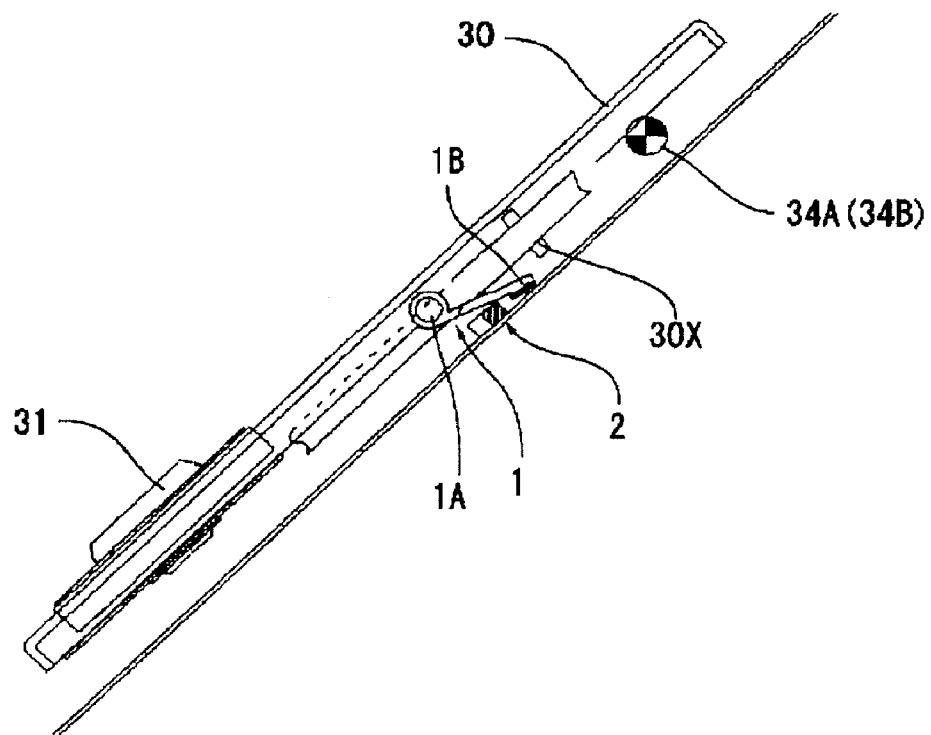

SLOT-IN TYPE DISK APPARATUS

TECHNICAL FIELD

The present invention relates to a disk apparatus for recording or replaying into or from a disk-like recording medium such as a CD and a DVD, and more particularly, to a slot-in type disk apparatus into which and from which a disk can directly be inserted or discharged.

BACKGROUND TECHNIQUE

According to a conventional disk apparatus, there is widely employed a loading system in which a disk is placed on a tray or a turntable, and the tray or the turntable is loaded into an apparatus body. According to such a loading system, since the tray or the turntable is required, there is a limit to reduce the thickness of the disk apparatus body. Therefore, there recently exists a slot-in type disk apparatus in which a disk is directly operated by a lever or the like using a loading motor (e.g., patent document 1).

[Patent Document 1] Japanese Patent Application Laid-open No. 2002-352498

DISCLOSURE OF THE INVENTION

Problem to be Solved by the Invention

If the thickness of the apparatus is reduced, however, the insertion space of a disk is reduced, and if a pickup moves from a predetermined evacuation position, there is a problem that the pickup is damaged by an inserted disk.

Hence, it is an object of the present invention to provide a slot-in type disk apparatus in which a pickup does not move from a predetermined evacuation position.

Means for Solving the Problem

A first aspect of the present invention provides a slot-in type disk apparatus in which a base body and a lid constitute a chassis sheath, a disk-insertion opening into which a disk is directly inserted is formed in a front surface of the chassis sheath, a traverse base is disposed on the side of a front surface of the base body, the traverse base holds a spindle motor, a pickup and a rail on which the pickup moves, the spindle motor is provided on the side of one end of the traverse base, the pickup is movably provided on the traverse base, and the pickup is disposed on the other end side of the traverse base at the time of standby, wherein the traverse base is provided with a pick-stopper, the pick-stopper moves to a position where the movement of the pickup is restrained when the traverse base is moved toward the base body, and the pick-stopper moves to a position where the movement of the pickup is not restrained when the traverse base moves toward the lid.

According to a second aspect of the invention, in the slot-in type disk apparatus of the first aspect, one end of the pick-stopper is a turning fulcrum and the other end of the pick-stopper is a movable portion, the pickup is movably provided on the rail by a bearing, and if the movable portion moves to a position where the movable portion abuts against the bearing, the pick-stopper restrains the pickup from moving.

According to a third aspect of the invention, the slot-in type disk apparatus of the second aspect further comprises a movable pick-stopper lever, and if one end of the pick-stopper lever moves between the pick-stopper and the base body, the movable portion of the pick-stopper is held at a location where the movable portion abuts against the bearing.

According to a fourth aspect of the invention, the slot-in type disk apparatus of the third aspect further comprises a slider which moves in association with the traverse base, and the pick-stopper lever is moved by the slider.

Effect of the Invention

According to the present invention, even if an impact is applied, it is possible to prevent a pickup from largely moving from an evacuation position.

BRIEF DESCRIPTION OF THE DRAWINGS

FIG. 1 is a plan view of a base body showing a standby sate of a disk apparatus according to an embodiment of the present invention;

FIG. 2 is a plan view of an essential portion of the disk apparatus;

FIG. 3 is a side view of the essential portion of the apparatus;

FIG. 4 is a plan view of the base body showing a disk replaying state of the disk apparatus;

FIG. 5 is a plan view of the essential portion of the disk apparatus; and

FIG. 6 is a side view of the essential portion of the apparatus.

1 pick-stopper
1A turning fulcrum
1B movable portion
2 pick-stopper lever
2A shaft
2B one end
10 base body
11 disk-insertion opening
30 traverse base
32 pickup

BEST MODE FOR CARRYING OUT THE INVENTION

According to the slot-in type disk apparatus of the first aspect of the invention, the traverse base is provided with a pick-stopper, the pick-stopper moves to a position where the movement of the pickup is restrained when the traverse base is moved toward the base body, and the pick-stopper moves to a position where the movement of the pickup is not restrained when the traverse base moves toward the lid. With this aspect, since the pick-stopper which restrains the pickup from moving is provided, even if an impact or the like is applied, it is possible to prevent the pickup from significantly moving from the evacuation position.

According to the second embodiment, in the slot-in type disk apparatus of the first aspect, one end of the pick-stopper is a turning fulcrum and the other end of the pick-stopper is a movable portion, the pickup is movably provided on the rail by a bearing, and if the movable portion moves to a position where the movable portion abuts against the bearing, the pick-stopper restrains the pickup from moving. With this aspect, since the movable portion of the pick-stopper and the bearing restrain the pickup from moving, it is possible to hold the pickup at a predetermined position without damaging the pickup.

According to the third embodiment, the slot-in type disk apparatus of the second aspect further comprises a movable pick-stopper lever, and if one end of the pick-stopper lever moves between the pick-stopper and the base body, thereby holding the movable portion of the pick-stopper at a location where the movable portion abuts against the bearing. With this aspect, since the pick-stopper lever is interposed between the pick-stopper and the base body, it is possible to reliably restrain the pickup from moving even if the displacement amount of the traverse base is small.

According to the fourth embodiment, the slot-in type disk apparatus of the third aspect further comprises a slider which moves in association with the traverse base, and the pick-stopper lever is moved by the slider. With this aspect, the pick-stopper lever is moved by the slider which moves in association with the traverse base, the disk apparatus can reliably operate.

EMBODIMENT

A disk apparatus according to an embodiment of the present invention will be explained.

FIG. 1 is a plan view of a base body showing a standby sate of a disk apparatus according to an embodiment of the present invention. FIG. 2 is a plan view of an essential portion of the disk apparatus. FIG. 3 is a side view of the essential portion of the apparatus. FIG. 4 is a plan view of the base body showing a disk replaying state of the disk apparatus. FIG. 5 is a plan view of the essential portion of the disk apparatus. FIG. 6 is a side view of the essential portion of the apparatus.

According to the disk apparatus of the embodiment, a base body and lid constitute a chassis sheath, and a bezel is attached to a front surface of the chassis sheath. The disk apparatus of the embodiment is a slot-in type disk apparatus in which a disk is directly inserted from a disk-insertion opening formed in the bezel.

As shown in FIG. 1, parts which realize the recording and replaying function onto or from a disk and a loading function of a disk are attached to the base body 10.

The base body 10 is formed with a deep bottom 10A and a shallow bottom 10B. A wing portion extending from a front surface to a rear surface is formed by the shallow bottom 10B.

The base body 10 is formed at its front side with a disk-insertion opening 11 into which a disk is directly inserted, and a connector 12 is disposed on an end of a rear surface of the base body 10. A traverse base 30 is disposed on the base body 10 on the side of the disk-insertion opening 11, and a rear base 13 is disposed on the base body 10 on the side of the connector 12. The traverse base 30 and the rear base 13 are disposed such that they are not superposed on each other. A printed board 14 is provided on the rear base 13 on the side of the surface of the base body 10.

The traverse base 30 holds a spindle motor 31, a pickup 32 and driving means which moves the pickup 32. The spindle motor 31 is provided on the one end side of the traverse base 30, and the pickup 32 is provided such that the pickup 32 can move from one end to the other end of the traverse base 30. When the pickup 32 is in a standby state, the pickup 32 is disposed on the other end side of the traverse base 30. The drive means includes a drive motor 33A, a pair of rails 33B on which the pickup 32 slide, and a gear mechanism for transmitting a driving force of the drive motor 33A to the pickup 32. The pair of rails 33B are disposed on both sides such as to connect one end and the other end of the traverse base 30. The drive motor 33A is disposed outside of the rails 33B on the side of the disk-insertion opening 11 such that the drive shaft is in parallel to the rails 33B. The gear mechanism is disposed in a space between the drive motor 33A and the rails 33B on the side of the disk-insertion opening 11. The pickup 32 is slidably provided on the rails 33B by a bearing 30X.

In the traverse base 30, the spindle motor 31 is located at a central portion of the base body 10, a reciprocating range of the pickup 32 is located closer to the disk-insertion opening 11 than the spindle motor 31, and the reciprocating direction of the pickup 32 is different from the insertion direction of the disk. Here, an angle of 35° to 55° is formed between the reciprocating direction of the pickup 32 and the insertion direction of a disk.

The traverse base 30 is supported on the base body 10 by a pair of insulators 34A and 34B.

The pair of insulators 34A and 34B are disposed closer to a stationary position of the pickup 32 than the position of the spindle motor 31. In this embodiment, the insulator 34A is provided on the side of one end near the inner side of the disk-insertion opening 11, and the insulator 34B is provided at a central portion near the inner side of the disk-insertion opening 11. The insulators 34A and 34B includes damper mechanisms made of elastic material. The traverse base 30 brings the spindle motor 31 toward the base body 10 and away from the base body 10 around the insulators 34A and 34B as fulcrums.

A main slider 40 and a sub-slider 50 and a sub-slider 50 having cam mechanisms will be explained below. The cam mechanisms which displace the traverse base 30 are respectively provided on the main slider 40 and the sub-slider 50. The main slider 40 and the sub-slider 50 are disposed on the side of the spindle motor 31. The main slider 40 is disposed such that its one end comes on the side of a front surface of the chassis body 10 and its other end comes on the side of a rear surface of the chassis body 10. The sub-slider 50 is disposed between the traverse base 30 and the rear base 13 in a direction perpendicular to the main slider 40.

The cam mechanisms which displace the traverse base 30 comprise a first cam mechanism 41 and a second cam mechanism 51. The first cam mechanism 41 is provided on a surface of the main slider 40 on the side of the spindle motor 31, and the second cam mechanism 51 is provided on the sub-slider 50 on the side of the spindle motor 31.

A base member 15 is provided between the main slider 40 and the traverse base 30. A base member 16 is provided between the sub-slider 50 and the traverse base 30. The base member 15 and the base member 16 are fixed to the base body 10. A position of a cam pin of the traverse base 30 is limited by a vertical groove formed in the base member 15, and a position of the cam pin of the traverse base 30 is limited by a vertical groove formed in the base member 16.

The base member 16 and the sub-slider 50 are connected to each other through a third cam mechanism (not shown). The third cam mechanism has a function for moving the sub-slider 50 away from the base body 10 when the traverse base 30 is moved away from the base body 10 by the second cam mechanism 51.

A loading motor 60 is disposed on the side of one end of the main slider 40. A drive shaft of the loading motor 60 and the one end of the main slider 40 are connected to each other through a gear mechanism.

By driving the loading motor 60, the main slider 40 can slide in the longitudinal direction. The main slider 40 is connected to the sub-slider 50 by a cam lever 70.

The cam lever 70 includes a turning fulcrum 71, a pin 72, a pin 73 and a pin 74. The pins 72 and 73 engage with a cam groove formed in an upper surface of the main slider 40, the pin 74 engages with a cam groove formed in an upper surface of the sub-slider 50, and the cam lever 70 turns around a turning fulcrum 71 as an axis.

The above-explained connector 12, traverse base 30, rear base 13, printed board 14, insulators 34A and 34B, main slider 40, sub-slider 50 and loading motor 60 are provided on the deep bottom 10A of the base body 10, and form a disk inserting space between these members and the lid.

Next, a guide member for supporting a disk when the disk is to be inserted, and a lever member which operates when a disk is inserted will be explained below.

A first disk guide 17 having a predetermined length is provided on the side of one end of the deep bottom 10A near the disk-insertion opening 11. The first disk guide 17 has a groove having a U-shaped cross section as viewed from the disk inserting side. A disk is supported by this groove.

A pull-in lever 80 is provided on the shallow bottom 10B on the side of the disk-insertion opening 11. A second disk guide 81 is provided on a movable side end of the pull-in lever 80. The second disk guide 81 comprises a cylindrical roller, and is turnably provided on the movable end of the pull-in lever 80. A groove is formed in a roller outer periphery of the second disk guide 81, and a disk is supported by this groove.

The movable end of the pull-in lever 80 is operated closer to the disk-insertion opening 11 than the stationary side. The pull-in lever 80 has a turning fulcrum on the stationary end.

The pull-in lever 80 is operated by a sub-lever 90.

The sub-lever 90 has a projection on the movable side one end, and a turning fulcrum 92 on the other end. The projection of the sub-lever 90 slides in a long groove in the pull-in lever 80. The turning fulcrum 92 of the sub-lever 90 is located on the main slider 40. The turning fulcrum 92 is not operated in association with the main slider 40, and is fixed to the rear base 13. A pin 93 is provided on a lower surface of the sub-lever 90 at a location closer to the projection than the turning fulcrum 92. The pin 93 slides in the cam groove formed in an upper surface of the main slider 40. Therefore, the angle of the sub-lever 90 is changed as the main slider 40 moves, and if the angle of the sub-lever 90 is changed, the turning angle of the pull-in lever 80 is changed. That is, the second disk guide 81 of the pull-in lever 80 moves toward and away from the spindle motor 31 by the operation of the sub-lever 90.

A discharge lever is provided on the base body 10 at its side different from the pull-in lever 80, but explanation thereof will be omitted here. The discharge lever is operated in association with motion of the main slider 40 through a link arm 105 and a discharge slider 106. Here, the link arm 105 is turnably provided on the rear base 13 by a shaft 105A, its one end side is connected to the main slider 40 through a pin 105B, and the other end is in contact with the discharge slider 106 through a pin 105C. The discharge lever is engaged with a cam groove in the discharge slider 106 through a cam pin.

A restriction lever 110 is provided on the side of a rear surface of the rear base 13. An end of the restriction lever 110 on the side of its rear surface is a turning fulcrum 111, and an end of the restriction lever 110 on the movable side has a guide 112. The side of the guide 112 of the restriction lever 110 is always biased such as to project toward the front side by an elastic body. The restriction lever 110 operates a limit switch at a predetermined position. That is, if a disk is inserted to a predetermined position, the limit switch is turned OFF, and the loading motor 60 is driven. If the loading motor 60 is driven, the main slider 40 slides.

The base body 10 is provided at its front side with a front guider 21. The front guider 21 is provided on the side of one end of the disk-insertion opening 11, and is disposed between the pull-in lever 80 and the disk-insertion opening 11. The front guider 21 is provided closer to the lid than the loading motor 60, the gear mechanism and the main slider 40 such as to cover portions of the loading motor 60, the gear mechanism and the main slider 40.

The operation of the cam lever will be explained below.

While the pin 73 is in engagement with the cam groove of the main slider 40, the cam lever 70 does not turn. This state is the standby state. This state continues for a while even after a disk is loaded, and the traverse base 30 is close to the base body 10.

The pin 73 comes out from the cam groove of the main slider 40 when the center of the disk comes above the spindle motor 31, and the cam lever 70 starts turning.

The first cam mechanism 41 provided on the main slider 40 moves in the same direction as the main slider 40. The main slider 40 has a groove in which the pin 72 of the cam lever 70 slides, the sub-slider 50 moves by turning the cam lever 70, and if the sub-slider 50 moves, the second cam mechanism 51 moves.

That is, if the main slider 40 moves, the first cam mechanism 41 moves by a predetermined distance, and if the cam lever 70 turns, the second cam mechanism 51 moves by a predetermined distance and the traverse base 30 is displaced.

When the chucking motion is completed, the turning motion of the cam lever 70 is completed.

Next, a structure for restraining the movement of the pickup 32 will be explained.

Especially as shown in FIGS. 2 and 3, one end of a pick-stopper 1 is a turning fulcrum 1A and the other end thereof is a movable portion 1B, and the pick-stopper 1 is provided on the side of the traverse base 30. A pick-stopper lever 2 can turn around a shaft 2A, and one end 23 of the pick-stopper lever 2 can be disposed between the pick-stopper 1 and the base body 10.

In the standby state of the disk apparatus shown in FIGS. 1 to 3, the pick-stopper lever 2 is biased in the clockwise direction by the elastic body, and the one end 23 is disposed between the pick-stopper 1 and the base body 10.

If the one end 28 of the pick-stopper lever 2 is disposed between the pick-stopper 1 and the base body 10 in this manner, the movable portion 1B of the pick-stopper 1 holds a predetermined distance from the base body 10. Therefore, if the pickup 32 is moved by an impact from outside, the bearing 30X abuts against the movable portion 1B. That is, if the bearing 30X abuts against the movable portion 1B, it is possible to restrain the pickup 32 from moving.

Next, a state where the movement of the pickup is not restrained will be explained using FIGS. 4 to 6.

The disk apparatus is brought into a disk replaying state by the above-described chucking motion. The discharge slider 106 is brought into association with motion of the main slider 40, and the discharge slider 106 moves toward the disk-insertion opening 11.

The discharge slider 106 moves toward the disk-insertion opening 11 and presses the other end 2C of the pick-stopper lever 2.

Thus, the pick-stopper lever 2 turns in the counterclockwise direction around the shaft 2A, and the one end 2B of the pick-stopper lever 2 moves away from the movable portion 1B of the pick-stopper 1.

In this state, especially as shown in FIG. 6, the movable portion 1B of the pick-stopper 1 moves to a position where the pick-stopper 1 comes into contact with the base body 10. Thus, even if the pickup 32 moves, the bearing 30X does not abut against the movable portion 1B, and the movement of the pickup 32 is not restrained by the pick-stopper 1.

According to this embodiment, since the pick-stopper 1 which restrains the movement of the pickup 32 is provided, it is possible to prevent the pickup 32 from largely moving from the evacuation position even in an impact is applied.

If the movement of the pickup 32 is restrained by the movable portion 1B of the pick-stopper 1 and the bearing 30X as in this embodiment, it is possible to hold the pickup 32 at a predetermined position without damaging the pickup 32.

According to this embodiment, the movable pick-stopper lever 2 is provided and the one end 2B of the pick-stopper lever 2 moves between the pick-stopper 1 and the base body 10. With this, the movable portion 1B of the pick-stopper 1 can be held at a position where the movable portion 1B abuts against the bearing 30X, and the movement of the pickup 32 can reliably be restrained even if the displacement amount of the traverse base 30 is small.

If the discharge slider 106 which moves in association with the traverse base 30 and the pick-stopper lever 2 is moved by the discharge slider 106 as in this embodiment, the disk apparatus can reliably be operated.

This application is based upon and claims the benefit of priority of Japanese Patent Application NO. 2005-378944 filed on Dec. 28, 2005, the contents of which are incorporated herein by reference in its entirety.

INDUSTRIAL APPLICABILITY

In a disk apparatus for recording or replaying into or from a disk-like recording medium such as a CD and a DVD, the present invention can be utilized for a disk apparatus which is used as a domestic video device or a peripheral device, and which needs to be reduced in size.

The invention claimed is:

1. A slot-in type disk apparatus in which
a base body and a lid constitute a chassis sheath,
a disk-insertion opening into which a disk is directly inserted is formed in a front surface of the chassis sheath,
a traverse base is disposed on the side of a front surface of the base body,
the traverse base holds a spindle motor, a pickup and a rail on which the pickup moves,
the spindle motor is provided on the side of one end of the traverse base,
the pickup is movably provided on the traverse base, and
the pickup is disposed on the other end side of the traverse base at the time of standby, wherein
the traverse base is provided with a pick-stopper,
the pick-stopper moves to a position where the movement of the pickup is restrained when the traverse base is moved toward the base body, and the pick-stopper moves to a position where the movement of the pickup is not restrained when the traverse base moves toward the lid.

2. The slot-in type disk apparatus according to claim 1, wherein one end of the pick-stopper is a turning fulcrum and the other end of the pick-stopper is a movable portion, the pickup is movably provided on the rail by a bearing, and if the movable portion moves to a position where the movable portion abuts against the bearing, the pick-stopper restrains the pickup from moving.

3. The slot-in type disk apparatus according to claim 2, further comprising a movable pick-stopper lever, wherein if one end of the pick-stopper lever moves between the pick-stopper and the base body, the movable portion of the pick-stopper is held at a location where the movable portion abuts against the bearing.

4. The slot-in type disk apparatus according to claim 3, further comprising a slider which moves in association with the traverse base, wherein the pick-stopper lever is moved by the slider.

* * * * *